(12) United States Patent
Boss et al.

(10) Patent No.: US 7,725,103 B2
(45) Date of Patent: May 25, 2010

(54) MOBILE COMMUNICATION DEVICE DYNAMIC SERVICE APPLICATION AND DYNAMIC SERVICE APPLICATION SCRIPTING

(75) Inventors: Jerome Boss, Bellevue, WA (US); Lili Cheng, Bellevue, WA (US); Cezary Marcjan, Redmond, WA (US); David Milstein, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1537 days.

(21) Appl. No.: 11/013,161

(22) Filed: Dec. 14, 2004

(65) Prior Publication Data
US 2005/0113139 A1 May 26, 2005

Related U.S. Application Data
(62) Division of application No. 09/789,432, filed on Feb. 20, 2001, now Pat. No. 7,418,254.

(51) Int. Cl.
*H04M 3/00* (2006.01)
(52) U.S. Cl. .............. 455/420; 370/241; 379/10.03; 379/27.04; 379/102.02; 379/102.03; 379/106.01; 379/201.05; 379/201.12; 455/418; 455/419; 455/423; 455/425; 709/202; 709/203; 709/208
(58) Field of Classification Search ............ 379/201.03, 379/10.03, 27.04, 102.02–102.03, 106.01, 379/201.05, 201.12; 455/418–420, 423, 455/425; 717/172–173; 370/241; 709/202–203, 709/208
See application file for complete search history.

(56) References Cited

U.S. PATENT DOCUMENTS
4,038,652 A * 7/1977 Schippers ................ 341/67
(Continued)

FOREIGN PATENT DOCUMENTS
EP 0748135(A2) 12/1996
(Continued)

OTHER PUBLICATIONS
Harley Hahn, The Unix Companion, 1995, Osborne McGraw Hill, 1st, Cover page, 2-3, 420-423, 430-431, 648-659, 618-619, 628-629.*
(Continued)

*Primary Examiner*—Hemant Patel
(74) *Attorney, Agent, or Firm*—Lee & Hayes, PLLC (57) ABSTRACT

A dynamic service application is stored and executed on a mobile or wireless communication device (e.g., a cellular telephone) to enable it to be programmed without specialized hardware, software, and other proprietary information. For example, dynamic service application programs or scripts may be entered directly by a user or may be received as a wireless or radiated digital message transmission. The dynamic service application executes the dynamic service application script, which is of a format to accommodate wireless or radiated transmission and storage on the device. The dynamic service application script may be written directly by a user on a computer or a mobile communication device or may be written with the aid of scripting "wizard" software that runs on a computer and guides the writing of script without the user having to work directly with the dynamic service application script. In addition to being received as radiated transmissions, dynamic service application scripts may also be sent as radiated transmissions from mobile communication devices to other devices or computers.

17 Claims, 2 Drawing Sheets

U.S. PATENT DOCUMENTS

| | | | | | |
|---|---|---|---|---|---|
| 5,517,194 | A | * | 5/1996 | Carroll et al. | 340/10.34 |
| 5,694,326 | A | * | 12/1997 | Warn et al. | 700/231 |
| 5,910,778 | A | * | 6/1999 | Klein et al. | 340/7.43 |
| 5,915,225 | A | * | 6/1999 | Mills | 455/558 |
| 6,055,442 | A | * | 4/2000 | Dietrich | 455/558 |
| 6,084,870 | A | * | 7/2000 | Wooten et al. | 370/349 |
| 6,092,133 | A | | 7/2000 | Erola et al. | 710/102 |
| 6,097,967 | A | | 8/2000 | Hubbe et al. | 455/558 |
| 6,104,924 | A | * | 8/2000 | Shirai | 455/418 |
| 6,212,674 | B1 | * | 4/2001 | Suckow | 717/109 |
| 6,278,885 | B1 | * | 8/2001 | Hubbe et al. | 455/558 |
| 6,314,306 | B1 | * | 11/2001 | Harris | 455/566 |
| 6,370,389 | B1 | * | 4/2002 | Isomursu et al. | 455/466 |
| 6,434,364 | B1 | * | 8/2002 | O'Riordain | 455/67.11 |
| 6,622,017 | B1 | * | 9/2003 | Hoffman | 455/419 |
| 6,628,965 | B1 | * | 9/2003 | LaRosa et al. | 455/557 |
| 6,681,110 | B1 | * | 1/2004 | Crookham et al. | 455/420 |
| 6,782,253 | B1 | * | 8/2004 | Shteyn et al. | 455/414.1 |
| 6,816,887 | B1 | * | 11/2004 | Shaw et al. | 709/207 |
| 6,845,352 | B1 | * | 1/2005 | Wang | 703/24 |
| 6,880,016 | B1 | * | 4/2005 | Van Der Heijden et al. | 709/230 |
| 7,020,457 | B2 | * | 3/2006 | Poor et al. | 455/412.1 |
| 7,024,187 | B2 | * | 4/2006 | Moles et al. | 455/423 |
| 7,054,614 | B1 | * | 5/2006 | Hunzinger | 455/411 |
| 7,194,278 | B1 | * | 3/2007 | Cook | 455/461 |
| 2001/0052030 | A1 | * | 12/2001 | Shiraishi | 709/310 |
| 2002/0002453 | A1 | * | 1/2002 | Lazaridis et al. | 704/9 |
| 2002/0045441 | A1 | * | 4/2002 | Ralston et al. | 455/418 |
| 2002/0183051 | A1 | * | 12/2002 | Poor et al. | 455/418 |
| 2003/0018764 | A1 | * | 1/2003 | Shell et al. | 709/223 |

FOREIGN PATENT DOCUMENTS

WO    WO0167622 A2 *    9/2001

OTHER PUBLICATIONS

"Client—Server Protocol Specification—Wireless Internet Gateway", AU-Systems, May 21, 1999, p. 1-22.

"Client Implementation Guidelines—Wireless Internet Gateway", AU-System, May 21, 1999, p. 1-14.

"Export-Produktbescbreibung STARSIM Browser Suite", Giesecke & Devrient, Nov. 30, 2000, p. 1-5.

Kobler, et. al., "For the Supply of a STARSIM Browser Suite", Giesecke & Devrient, Feb. 1, 2001, p. 1-2.

Mitschke-Collande, et al., "Supply and Delivery of SIM Cards and STARSIM Browser Suite", Giesecke & Devrient, Nov. 30, 2000, p. 1-3.

Nehls, et al., "Supply and Delivery of SIM Cards and STARSIM Browser Suite", Giesecke & Devrient, Jan. 23, 2001, p. 1-3.

Reisinger, et al., "Supply of STARS 1M Browser Suite, SIMmaster, SIMCommander and STARSIM Designer", Giesecke & Devrient, Jan. 17th, 2001, p. 1-3.

Reisinger, et al., "Supply of STARSIM Browser Suite", Giesecke & Devrient, Nov. 23, 2000, p. 1-2.

"STARSIM Banking, Secure Mobile Banking Applications", Giesecke & Devrient, 2000, p. 1-5.

"STARSIM Browser Suite, Wireless Internet Application Development", Giesecke & Devrient, 2000, p. 1-7.

"STARSIM Browser, Visions of Internet in your Pocket", Giesecke & Devrient, 2000, p. 1-5.

* cited by examiner

Fig. 1

MOBILE COMMUNICATION DEVICE DYNAMIC SERVICE APPLICATION AND DYNAMIC SERVICE APPLICATION SCRIPTING

CROSS REFERENCE TO RELATED APPLICATION

This application claims priority to and is a divisional of U.S. patent application Ser. No. 09/789,432, filed Feb. 20, 2001, which is incorporated herein by reference.

SUMMARY

The present invention relates to mobile or wireless communication devices, including digital cellular telephones, and in particular to a short text message dynamic service application for such devices.

Programming small mobile or wireless communication devices, like digital cellular telephones phones, typically requires specialized hardware or software, or access to proprietary information like authentication keys, codes, etc. As a consequence, it is typically difficult or impossible for end-users to program such mobile devices. As is known in the art, digital cellular telephones of the GSM-type include removable Subscriber Identity Modules (SIMs), which are sometimes called smart cards or chip cards. To program a GSM cellular telephone, for example, it is necessary to use a smart card programming device and a smart card programming toolkit, and to access the account authentication key, the last of which is typically not accessible except by wireless service providers. The inability of users to program or modify mobile or wireless communication devices limits the versatility and usefulness of such devices.

Accordingly, the present invention includes a dynamic service application that is stored and executed on a mobile or wireless communication device to enable it to be programmed without specialized hardware, software, and other proprietary information. For example, the dynamic service application may be distributed with or stored on the wireless device in a conventional manner, but dynamic service application programs or scripts may be entered directly by a user or may be received as a wireless or radiated digital message transmission. In contrast, conventional programming of such a device requires a direct or conductive hardware coupling to the device.

The dynamic service application executes the dynamic service application script, which is of a format that accommodates wireless or radiated transmission and storage on the device. The dynamic service application script may be written directly by a user on a computer or a mobile communication device or may be written with the aid of scripting "wizard" software that runs on a computer and guides the writing of script without the user having to work directly with the dynamic service application script. In addition to being received as radiated transmissions, dynamic service application scripts may also be sent as radiated transmissions from mobile communication devices to other devices or computers.

In one exemplary implementation, a dynamic service application of the present invention may be stored on a SIM or smart card for use in an associated GSM cellular telephone. Dynamic service application scripts may be received at and sent from the GSM cellular telephone as short text message dynamic service scripts that conform to the short message service (SMS) format for GSM cellular telephones. In communicating with a conventional (e.g., desktop) computer, the scripts may be prepared and sent or received and run by software operating locally on the computer or at a site on the global computer network (e.g., a Web site).

The dynamic service application interprets and executes short text message dynamic service scripts that the cellular telephone receives, whenever the scripts are supported by a service present on the cellular telephone. The contents of the short text message dynamic service script could be either a new application, a part of the application (e.g., applications could be broken into segments), an application update, a command to execute, or data for a particular application. The user can also send messages from the phone to the web site. These messages can be distributed to other users as needed.

Additional objects and advantages of the present invention will be apparent from the detailed description of the preferred embodiment thereof, which proceeds with reference to the accompanying drawings.

DETAILED DESCRIPTION

The present invention relates to mobile or "wireless" communication devices capable of transmitting and/or receiving radiated (i.e., wireless) fixed length text messages of up to a maximum fixed length. Such communication devices may be implemented with various functions and in numerous forms including digital cellular telephones, portable and handheld computers, personal digital assistants, etc. The invention is described in reference to a digital cellular telephone, but is similarly applicable to other mobile or wireless communication devices that transmit and/or receive radiated fixed length text messages.

Figure 1:
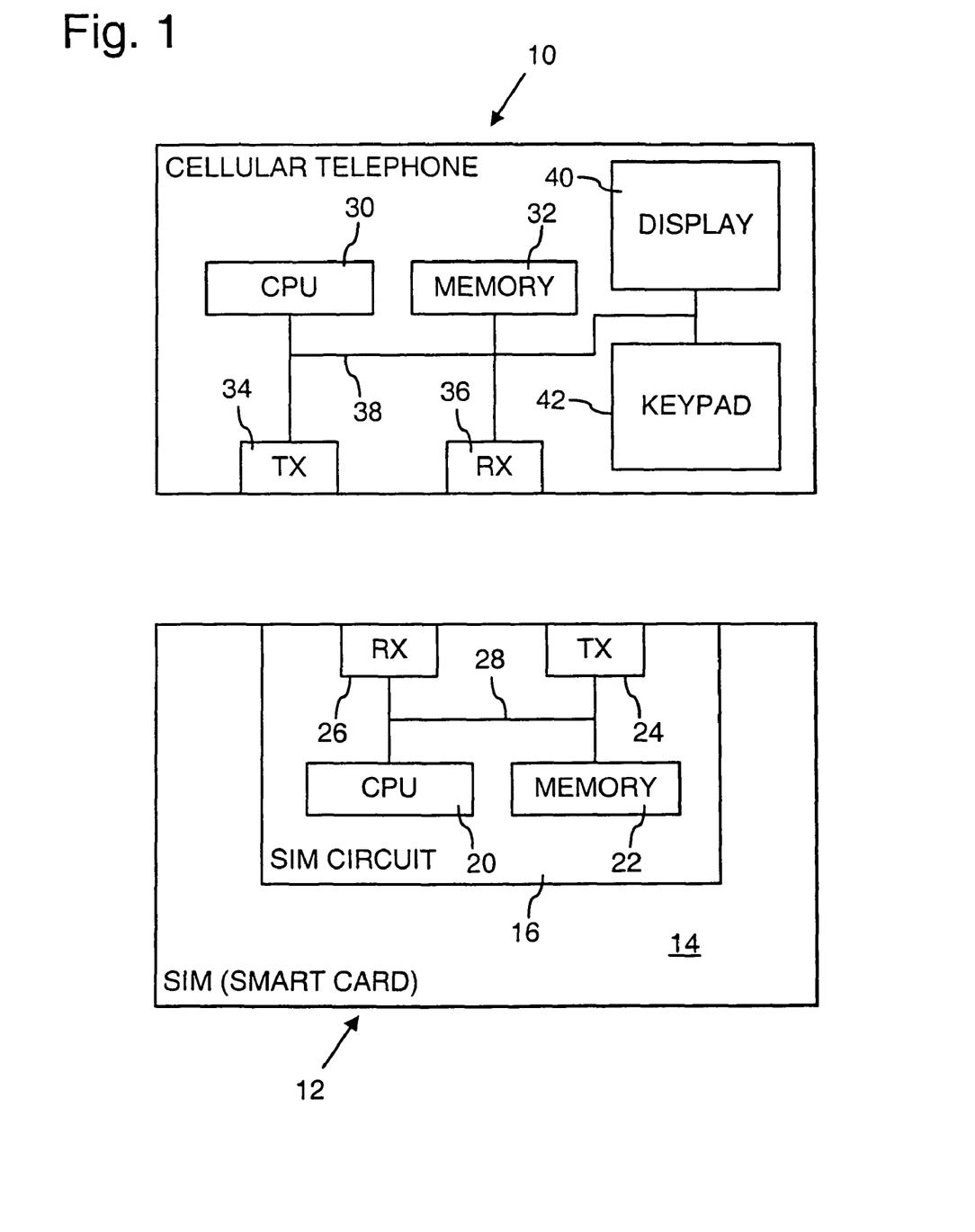
FIG. 1 illustrates a GSM cellular telephone as an exemplary mobile wireless communication device operating environment for an embodiment of the present invention.

FIG. 1 illustrates a GSM cellular telephone 10 as an exemplary mobile wireless communication device operating environment for an embodiment of the present invention. GSM cellular telephone 10 may conform, for example, to the European Telecommunications Standards Institute (ETSI) specifications GSM 11.11 and GSM 11.14 for Global Systems for Mobile communications. It will be appreciated, however, that GSM cellular telephone 10 could instead conform to another communication standard or a standard not yet developed, such as the ETSI 3rd Generation Mobile System standard that is sometimes referred to as the Third Generation Partnership Project or "3GPP".

GSM cellular telephone 10 includes a removable Subscriber Identity Module (SIM) 12, which is sometimes called a smart card or chip card. For example, SIM 12 can be of a smart card format that has the well-known size of credit cards (e.g., standardized dimensions of 53.98 mm×85.60 mm×0.76 mm), or can be of a smaller format that is sometimes called a "plug-in SIM". SIM 12 includes a medium 14 that supports a SIM electronic circuit 16 (e.g., one or more semiconductor integrated circuits or chips). Medium 14 typically includes multiple laminated synthetic layers, with one or more internal layers being between outer layers. SIM electronic circuit 16 is incorporated into or on at least one of the internal layers.

SIM electronic circuit 16 includes a central processing unit or CPU 20 (e.g., a microprocessor or microcontroller) in conjunction with a memory system 22, a data transmit interface 24, and a data receive interface 26, all of which are interconnected by a bus structure 28. Similarly, GSM cellular telephone 10 includes a central processing unit or CPU 30 (e.g., a microprocessor or microcontroller) in conjunction with a memory system 32, a data transmit interface 34, and a data receive interface 36, all of which are interconnected by a bus structure 38. In addition, GSM cellular telephone 10 includes a system display 40 and a user input device or keypad 42, as well as a power supply (e.g., a battery), telephonic audio input and output elements, and radio frequency transmitting and receiving elements that are not shown.

While SIM electronic circuit 16 includes the basic elements of a simple computer, neither SIM 12 nor SIM electronic circuit 16 is capable of functioning as a stand-alone computer. Neither SIM 12 nor SIM electronic circuit 16 includes a power source nor user interface components by which a user could interact with SIM 12 or SIM electronic circuit 16. The computer functionality of SIM 12 can be accessed only by connecting it to another computer, such as GSM cellular telephone 10 or a SIM reader that is connected to a personal computer, as is known in the art. When connected to another computer, such as GSM cellular telephone 10, SIM 12 is powered and communicates through its interfaces 24 and 26 to receive data from and provide data to the other computer.

As is common, GSM cellular telephone 10 supports a fixed length text message service by which radiated (i.e., wireless) fixed length text messages of up to a maximum fixed length may be transmitted or received by GSM cellular telephone 10. As an example, the fixed length text message service could include or conform to the short message service (SMS) standard that is part of the GSM Phase 1 standard. The SMS standard allows transmission of radiated fixed length text messages of up to 160 characters in length. Such a fixed length text message service may be distinguished from conventional network connections or services in which files of generally arbitrary size may be transmitted. While referring to transmission of SMS messages, the following description may be similarly applicable to other standards or formats for radiated fixed length text messages.

Figure 2:
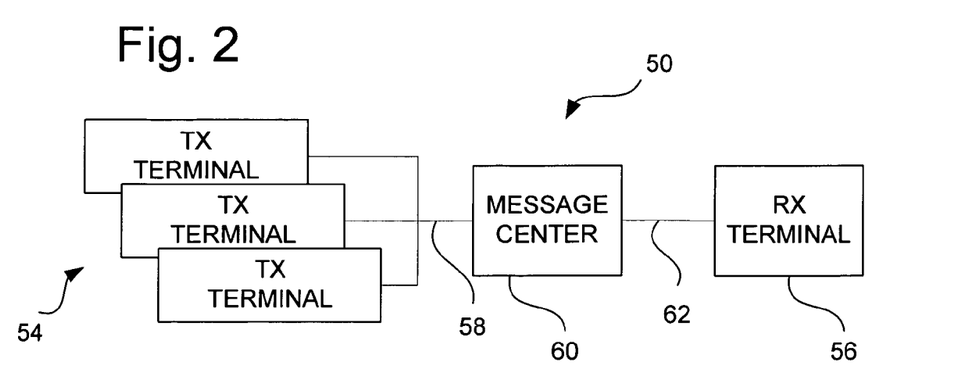
FIG. 2 is a block diagram illustrating operation of a short message service (SMS) system compatible with transmission of short text message dynamic service scripts of the present invention.

FIG. 2 is a block diagram illustrating operation of a SMS system 50 for transmitting SMS messages from any of transmitting short message terminals 54 to a receiving short message terminal 56, which may be implemented as GSM cellular telephone 10.

For purposes of simplicity, this illustration is directed to communication in only direction: from transmitting short message terminal 54 to receiving short message terminal 56. It will be appreciated that each of short message terminals 54 and 56 would typically be capable of bi-directional communication so that the following description would be similarly applicable to communication from terminal 56 to any or all of terminals 54.

Transmitting short message terminal 54 may be any text-capable digital device, including a computer (e.g., desktop, portable, handheld, server, etc.), a personal digital assistant, a digital telephone, a digital cellular telephone, etc. An SMS message created at transmitting short message terminal 54 is transmitted over a communication channel 58 to a short message service center or message center 60 that functions as a store and forward center for transmitting SMS messages between short message terminals. For example, message center 60 receives a SMS message from transmitting short message terminal 54 and stores the SMS message until it can be forwarded to receiving short message terminal 56. Message center 60 then transmits the SMS message to receiving short message terminal 56 over a communication channel 62.

In view of the variety of devices that can function as message terminals 54 and 56, communication channels 58 and 62 may be or include any public or private computer network (e.g., the global computer network called the Internet) or any telephone network (e.g., any PSTN or any cellular or other wireless communication network). With receiving short message terminal being GSM cellular telephone 10 in the illustrated example, communication channel 62 will include at least a GSM cellular telephone network.

Figure 3:
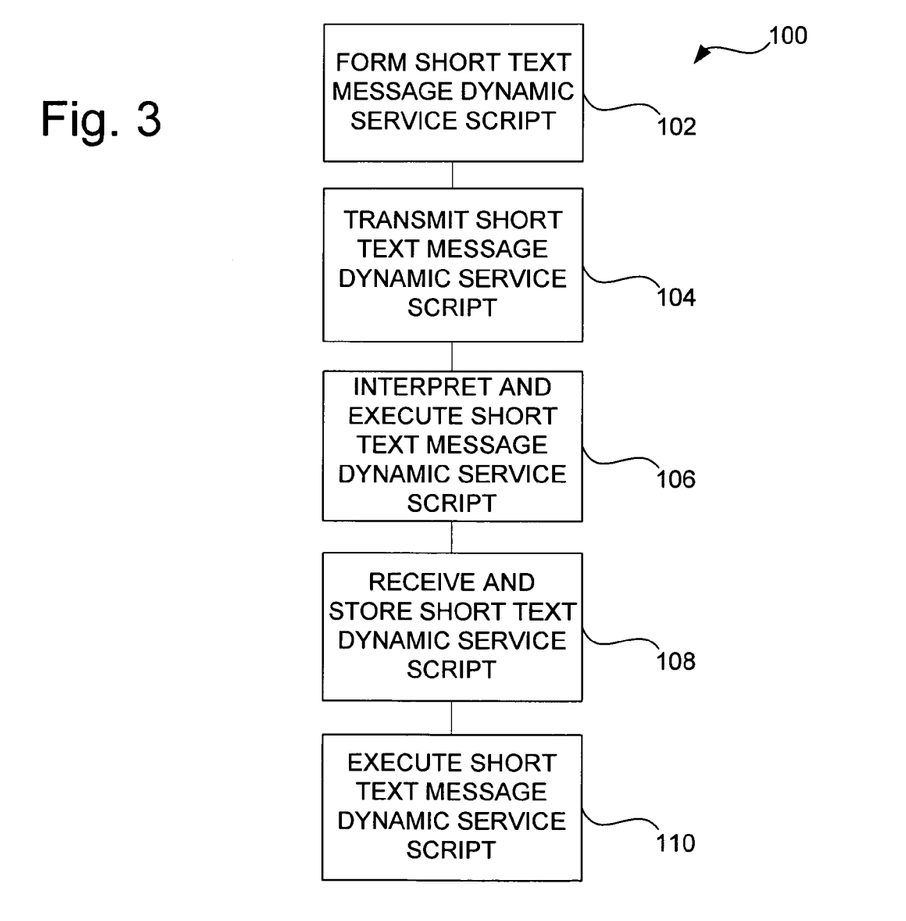
FIG. 3 is a flow diagram of a mobile device dynamic service method according to the present invention.

FIG. 3 is a flow diagram of a mobile device dynamic service method 100 according to the present invention. In one implementation, mobile device dynamic service method 100 is performed by various elements of SMS message system 50, including a dynamic service application stored on SIM 12. It will be appreciated that in other implementations, the dynamic service application may be stored or executed on any part of a short message terminal 54 or 56.

Process block 102 indicates that a short text message dynamic service script is formed. In one implementation, the short text message dynamic service script may conform to the SMS message format associated with GSM cellular telephones.

Process block 104 indicates that the short text message dynamic service script is transmitted to a receiving short message terminal. For example, the short text message dynamic service script could be transmitted via a message center 60 to GSM cellular telephone 10.

Process block 106 indicates that the short text message dynamic service script is interpreted and executed by the dynamic service application. Interpretation of the short text message dynamic service script by the dynamic service application includes correlating operations indicated by the short text message dynamic service script with the corresponding application programming interfaces (APIs) and any other resources available from SIM 12. For example, one option is to save the script and add the application name to the cellular telephone.

Process block 108 indicates that the short text message dynamic service script is received and stored, such as on a SIM 12 of a GSM cellular telephone 10.

Process block 110 indicates that the short text message dynamic service script is executed, such as on a SIM 12 of a GSM cellular telephone 10.

The short text message dynamic service scripts functions as short text message applications and can be formed in a variety of ways. As one example, a user could write a short text message application directly in accordance with a scripting notation, as described below in greater detail. As another example, a user may be guided through a script formation process or "wizard" that is accessed from a personal computer. The script formation process or "wizard" may be run locally on the personal computer or may be accessed from a network site (e.g., a Web page) on the global computer network.

Set forth below are exemplary steps through which scripting wizard software could direct a user creating a short text message dynamic service script or application. The exemplary steps could be offered or presented to the user in different sequences according to choices or selections made by the user. Once each branch or segment of the application is completed, the scripting wizard software codes and encrypts the application so that it can be sent to the receiving mobile communication device (e.g., GSM cellular telephone 10) as one or more short text messages (e.g., SMS messages). Once it receives the one or more short text messages, the dynamic service application on the mobile communication device interprets it or them and executes the steps as specified in the script. As an example, one option is to save the script and add the application name to the mobile communication device (e.g., cellular telephone).

User Selects Application Options:
1. Specify application name and various application properties
   A. Name
   B. Description
   C. Access (Publish/don't publish in directory service)
   D. Membership (Members only/open to public)
   E. Author information
2. Execute on the cell phone only once
   A. Manually (application is added to the phone app menu and deleted after execution)
   B. Upon receipt of SMS message
   C. With a delay after receiving SMS message
   D. At a specified time, date
   E. Triggered with events
3. Execute on the cell phone more than once
   A. Manually (application is added to the phone app menu)
   B. With specified interval
   C. At specified time(s), date(s)
   D. Triggered with events User selects initial interaction type between the application and the cell phone user after the application is launched.

Examples of Operations:
1. Show selection list (user is required to select item(s) from a list)
   A. Enter text describing the list
   B. Enter items of the list
   C. Specify operation(s) to execute upon selection of an item (each item may be associated with a different operation that follows)
2. Show "edit box" (user is required to enter text)
   A. Enter text describing the edit box (description of the text to be entered).
   B. (Optional) Enter a text string that triggers a specific operation and specify this operation.
   C. (Optional) Additional specification(s) as in B.
   D. (Optional) Specify operation(s) to execute after any other non-empty text is entered.
3. Print text
   A. Specify text to be printed
   B. Specify delay time before continuing, or manual continuation
   C. Specify conditions under which this operation (print text) will or will not execute (time, location, . . . ). Execution continues with the following operation (C)
   D. (Optional) Specify operation to execute after text is printed.
4. Play tone
   A. Specify tone parameters (type of tone, length, etc)
5. Send message/command to specified destination(s)
   A. Specify message/command
   B. (Optional) Specify operation to execute after message/command is successfully sent
   C. (Optional) Specify operation to execute after sending message/command failed.
6. File operation
   A. Clear
   B. Delete
   C. Delete Item
   D. Append Selected aspects of a first implementation of a format of a short text message dynamic service script are described below with reference to an exemplary script. It will be appreciated that this exemplary script is provided merely to illustrate the various script elements and does not include all potential elements in the script format or the full range of potential functionality that can be provided by the script format.

In this implementation, a typical script includes a file or variable with multiple successive statements that each may include one or more script elements. The successive statements of a script may form one or more files that are each no larger than the basic memory buffer size for a receiving mobile or "wireless" communication device (e.g., 128 bytes for a SIM), thereby allowing a complete script file to be completely contained in the memory buffer. In the illustrated exemplary script, different statements are initiated by the terms Start, Efopen, Cont1, Iter, Cont2, which may be referred to as the statement names.

```
Start:

!gEFopen
oF1"/Pgm/SV.m"
gCont1
EFopen:

T1 = "Error opening file"
T1 < T0 < " ("<hIE<")"
pT1
q
Cont1:

T2 = "T1 = s"
!gCont2
I1 = 0
Iter:

T2 < "," < h22 < F1 (I1, 11) < h22
I1 + 16
gIter
Cont2:

T2 < "q;"
!q
cF1
xT2
tT1
T2 = "/Pgm/"
T2 < T1
T2 < ".a"
oF1T2
xF1
q
```

In this implementation, script elements are generally represented by only one or two alphanumeric characters to minimize the script size, and operators are indicated by lower case letters. For example, the Start statement begins with an error handling indicator "!" that is coupled with a get element "g" and a statement name "EFopen." This script element combination is interpreted and executed by the dynamic service application as follows: if an error arises (!), get (g) the indicated statement (EFopen). The get element g may have as its argument any statement name in a file, a file name, a memory location pointer, etc. Accordingly, the get element g functions as a versatile program control device for directing script execution toward a variety of elements.

The EFopen statement sets a text variable (T1) to a text string "Error opening file," and the element T1<T0<" ("<hIE<")" functions to append a text variable T0 and the text "(32)" (where the value of 32 is an example value of the file handle, hIE) to text variable T1, with the text variable T0 being a temporary buffer having the value of _the file name (last statement's text). Element pT1 functions to print (p) (i.e., display) the error indication specified for variable T1 (i.e., text string "Error opening file."), and the quit element (q) ends execution of the script.

In the absence of an error indication by the executing mobile device, the Start statement proceeds to the script element oF1"IPgm/SV.m", which opens (o) as a file variable (F1) the file SV.m stored on the device in subdirectory Pgm. The .m extension may indicate that the file SV.m is a listing or menu of available script or application files available in the Pgm subdirectory. The script element gCont1 then gets (g) statement Cont1. The file variable (F1) represents a file-type variable that can be indexed over a range of values to support file operations (e.g., open, o). This script format implementation also includes, for example, an indexed text variable (e.g., T1) and an indexed numeric or numeric variable (e.g., I1) to support text and integer operations, respectively.

In the Cont1 statement, script element T2="T1=s" sets a text variable index T2 to the indicated text string (T1=s). Script element !gCont2 directs the script to get or goto (g) statement Cont2 in case of an error indication. Script element I1=0 sets a value of zero to the integer variable I1.

In the absence of an error indication in it, statement Cont1 proceeds to statement Iter, which functions as an iteration operation. Script element T2<","<h22<F1(I1, 11)<h22 appends to text variable T2 a comma, a quote (by operation of element h22), 11 characters at iteration variable location I1 in file F1, and another quote (by operation of element h22). Element I1+16 is an integer operation adding variable I1 and the number 16. Element glter repeats operation of statement Iter for another iteration. For example, each address location in a file could include 16 character positions, so this script element would function to obtain the first 11 characters at each address location in file F1.

In the Cont2 statement, element T2<"q;" appends a quit operator to text variable T2. As a result, of the operation of statements Iter and Cont2, variable T2 includes the following elements:

T2: T1=s, F1(0,11), F1(1,11), . . . , q;

in which the elements F1(0,11), F1(1,11), . . . include the 11 character text strings at locations 0, 1, . . . in file F1. The 11-character iteration may reflect that the mobile communication device displays 11 characters per line. Script element cF1 closes (c) file F1, and script element xT2 executes (x) variable T2, in which the select element s functions to display each text string F1 (1,11) so a user can select one of them. Script element tT1 trims spaces at the beginning and at the end of the text. The script elements T2="/Pgm/", T2<T1, and T2<".a" set variable T2 to the subdirectory and application name and extension (.a) of the application selected by the user. Script element oF1T2 opens as file F1 the specified file, and element xF1 executes it.

The exemplary script functions to display a list of text message applications available on a mobile communication device and to allow a user to select and execute one of the applications. It will be appreciated that such an application would typically require significantly greater memory and syntax resources if it were written in a conventional scripting language.

Selected aspects of a second implementation of a short text message dynamic service script format are described below. This second implementation includes more programming specificity than the first, but disadvantageously increases the memory requirements of the dynamic service application. Message consists of two components:
<MSGHEADER><COMMANDS>
<MSGHEADER>: <MSGID><MSGOPTS>/<APPNAME>
<MSGID>—Message ID for this recipient (cell phone, web site), sequence 0,1,2,3, . . . (only decimal digits)
<MSGOPTS>—Message options
  A—ACK of the message with MSGID following (eg. A123)
  R—ACK of this message requested
  I—Install as application. <COMMANDS> are stored in a file, added to apps menu, and executed by the user. Otherwise <COMMANDS> are executed upon receipt of the message.
  C<Item>-<Of>—Not complete message. This is item <Item> of <Of> items. The contents of this message is appended to already loaded chunks.
<APPNAME>—Name of the application represented by the message contents Example: 98I/Nearby
<COMMANDS> consists of a set of <CMD><CMDOPT>/<CMDBODY> separated with '&'
  <CMD>—Command:
    S—Select item from the list of items in the <CMDBODY> separated with '/'
    The text before the first '/' after <CMDOPT> is the description of the items to select. If it is empty (<CMD><CMDOPT>// . . . ) then the text "Select:" is printed.
    <CMDOPT> (all optional):
      A—append to clipboard
      T—the result is text of the selected item instead of index (1,2, . . . )
      E<CMDID>—error handler—command to execute next on error.
        <CMDID> specifies which command to execute (1,2, . . . )
    Result: Selected item. Result is appended to the clipboard
    Notes: All items are separated with '/' and optionally, following the separator is a number that specifies a command ID of a command to execute if this item is selected.
    The first item is the title of the selection with optional preceding default command ID.
    Examples:
      S/Where?/My Office/Room 123/Park
      SML1E13A/15Where?/12My Office/14Room 123/15Park
  E—Enter value (text) for the text described in the body.
  <CMDOPT>/<CMDID><Text>[/<CMDID><Text>/<CMDID><Text> . . . ]
    <CMDOPT> (all optional):
      L—Allow letters and digits
      A—Append to clipboard
      T—append to text the clipboard, save clipboard
      C—Set clipboard (default)
      D—Allow to enter decimal digits only
      N—specifies minimum size of input (followed by size)
      X—specifies maximum size of input (followed by size)

E<CMDID>—error handler—command to execute next on error.
    <CMDID> specifies which command to execute (1, 2, . . . )
Result: Entered item text. Result is added to the clipboard depending on the options specified.
Notes:
    The body of the command may consist of a list of items separated with '/' with preceding command ID of a command to execute if this item is entered.
    The first item is the title of the edit box with optional preceding default command ID (command to be executed next).
Examples:
    E/Enter your name
    EX8N3E13A/31Enter your name:/01Cezary/02Harry/03Lili/04 007
P—Print text <CMDOPT>/<CMDID><Text>
    <CMDOPT>:
        T—Append to the text content of the clipboard and print the result
        C—Append the specified text to the clipboard and print the result
        E<CMDID>—error handler—command to execute next on error.
            <CMDID> specifies which command to execute (1,2, . . . )
Result: Printed text. Result is appended to the clipboard if T nor C specified. If option T is specified the clipboard contains the printed text.
Examples:
    P/Hello World!
    PTE13/Hello World!
F—File operation
    <CMDOPT> (One of C, A, O, D required):
        C—Append the content of the specified file to the clipboard
        A—Append the text of the clipboard to the specified file
        O—Overwrite the content of the file with the content of clipboard
        D—Delete specified file
        B—Treat file as binary
        E<CMDID>—error handler—command to execute next on error.
            <CMDID> specifies which command to execute (1,2, . . . )
Examples:
    FC/"/Pgm/Test.data"
    FBOE13/"/7F20/6F74"
C—Clipboard operation—set the content to the specified text
    <CMDOPT>/<ContCommandID><Text>
        T—Append to the text content of the clipboard and store the result
        C—Clear the contents
        A—Append the specified text (instead of setting the value)
        E<CMDID>—error handler—command to execute next on error.
            <CMDID> specifies which command to execute (1,2, . . . )
Examples:
    C/Hello World!
    CAE13/Hello World!

EXAMPLES:
&P/Hello World!!!
&C/Hello . . . &PC/from clipboard!!!
&C/hello!!!&PT/From clipboard
&C/Hello &EA/Enter your name:&PC/, good to see you!

In accordance with the practices of persons skilled in the art of computer programming, the present invention is described above with reference to acts and symbolic representations of operations that are performed by various computer systems, including mobile communication devices and "smart cards." Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A mobile device dynamic service method in a mobile digital communication device that utilizes a radiated data signal having embodied thereon a short text message configured as a dynamic service script program having a data structure, the method comprising:

receiving, by the mobile digital communication device, the short text message embodied on the radiated data signal;

extracting, by the mobile digital communication device, the dynamic service script program having the data structure from the short text message, the data structure comprising:

a message header component comprising a first data field containing data indicative of a message identifier, a second data field containing data indicative of a message option of the identified message, and a third data field containing data indicative of a name of an application in a body of the short text message; and         a command component comprising a fourth data field containing a single character indicative of a command, and a fifth data field containing data to be used by the command when executed; and     executing, by a dynamic service application within the mobile digital communication device, the dynamic service script program to facilitate programming of the mobile digital communication device, wherein the dynamic service application is configured to execute variables, operators, program control elements, error indicators, iteration and displaying information of the dynamic service script program.

2. The method of claim 1, wherein the first data field and the second data field are concatenated without an immediate space.

3. The method of claim 1, wherein the message identifier includes only numeric characters.

4. The method of claim 1, wherein the message option includes at least one of a group consisting of an acknowledgement indicator, an acknowledgement requestor, an installation command, and an incomplete message indicator.

5. The method of claim 1, wherein the fifth data field contains a plurality of command bodies, each command body separated by a single separation character.

6. The method of claim 1, wherein the data structure contains a plurality of command components, each command component separated by a single separation character.

7. The method of claim 5, wherein the command is indicative of a command to: select an item from a list contained in the command body, print text contained in the command body, and operate on a file indicated in the command body.

8. The method of claim 1, wherein the data structure further comprises a sixth data field containing data indicative of a command option of the command, wherein the sixth data field has a length of no more than 2 characters.

9. A computer readable medium having computer executable instructions for performing acts for forming applications for a mobile digital communications device, the acts comprising:

providing a user input interface for:

specifying an application property;

specifying a manner of execution of the application as one of a group comprising: manual execution, upon receipt of a message, at a delay time after receiving the message, at a specified date and time, with a specified interval time, and upon occurrence of a user selected event;

specifying an initial interaction between the application and the mobile digital communications device;

specifying a short text message to send to a specified destination; and converting the application property, the manner of execution, the initial interaction, and the short text message into a short text message script file, the short text message script file comprising a message header component comprising a first data field containing data indicative of a message identifier, a second data field containing data indicative of a message option of the identified message, and a third data field containing data indicative of a name of an application in a body of the short text message file, wherein the first data field, the second data field, and the third data field are a spaceless string of characters containing only a single separation character, wherein the short text message script file comprises a dynamic service script program for execution by a dynamic service application within the mobile digital communication device, and wherein the dynamic service application executes variables, operators, program control elements, error indicators, and information of the dynamic service script program to facilitate programming of the mobile digital communication device.

10. The computer readable medium of claim 9, further comprising computer executable instructions for performing accessing a script formation process wizard which facilitates specifying the application property, specifying the manner of execution, specifying the short text message, and converting into the short text message script file.

11. The computer readable medium of claim 9, wherein the short text message script file is compatible with a short message service format.

12. The computer readable medium of claim 9, wherein the short text message script file has a length not greater than a single fixed length text message compatible with a cellular telephone protocol.

13. A mobile digital communication device that receives radiant transmission of short text messages comprising:

a dynamic service application that receives a radiantly transmitted short text message dynamic service script and interprets and executes the short text message dynamic service script on the mobile digital communication device to facilitate programming of the mobile digital communication device, the short text message dynamic service script comprising a message header component that includes a first data field ending with a numeric character containing data indicative of a message identifier, a second data field starting with an alphabetic character containing data indicative of a message option, and a third data field containing data indicative of a name of an application in a body of the short text message dynamic service script, wherein the second data field is appended to the first data field such that an ending numeric character of the first data field followed by the starting alphabetic character of the second data field distinguishes and end of the first data field from a start of the second data field; and a subscriber identity module or other chip card that is distinct from a base portion of the mobile digital communication device and that stores at least one executable operation indicated in the short text message dynamic service script.

14. The device of claim 13 in which the dynamic service application is stored on the subscriber identity module or other chip card.

15. The device of claim 13 in which the dynamic service application is stored and executed on the subscriber identity module or other chip card.

16. The device of claim 13 in which the short text message dynamic service script is stored on the mobile digital communication device for execution thereon more than once.

17. The device of claim 13 in which execution of the short text message dynamic service script on the mobile digital communication device includes obtaining information from an operator of the mobile digital communication device.

* * * * *

UNITED STATES PATENT AND TRADEMARK OFFICE
CERTIFICATE OF CORRECTION

| | | |
|---|---|---|
| PATENT NO. | : 7,725,103 B2 | Page 1 of 1 |
| APPLICATION NO. | : 11/013161 | |
| DATED | : May 25, 2010 | |
| INVENTOR(S) | : Jerome Boss et al. | |

It is certified that error appears in the above-identified patent and that said Letters Patent is hereby corrected as shown below:

In column 11, line 55, in Claim 9, after "message" insert -- script --.

Signed and Sealed this
Eighth Day of February, 2011

David J. Kappos
*Director of the United States Patent and Trademark Office*